US009756276B2

(12) United States Patent
Koizumi et al.

(10) Patent No.: US 9,756,276 B2
(45) Date of Patent: Sep. 5, 2017

(54) DISPLAY APPARATUS AND METHOD FOR CONTROLLING DISPLAY APPARATUS

(71) Applicant: SEIKO EPSON CORPORATION, Tokyo (JP)

(72) Inventors: Yasunori Koizumi, Hino (JP); Takehiko Tone, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 315 days.

(21) Appl. No.: 14/519,483

(22) Filed: Oct. 21, 2014

(65) Prior Publication Data

US 2015/0130899 A1    May 14, 2015

(30) Foreign Application Priority Data

Nov. 12, 2013 (JP) .................................. 2013-233739
Mar. 24, 2014 (JP) .................................. 2014-059803

(51) Int. Cl.
*H04N 13/00* (2006.01)
*H04N 5/74* (2006.01)
*H04N 21/488* (2011.01)
*H04N 21/81* (2011.01)

(52) U.S. Cl.
CPC ............. *H04N 5/74* (2013.01); *H04N 13/004* (2013.01); *H04N 13/0029* (2013.01); *H04N 21/4884* (2013.01); *H04N 21/816* (2013.01); *H04N 13/007* (2013.01)

(58) Field of Classification Search
None
See application file for complete search history.

(56) References Cited

U.S. PATENT DOCUMENTS

| 2003/0122925 | A1* | 7/2003 | Yoon ...................... G03B 35/20 348/51 |
| 2003/0234892 | A1* | 12/2003 | Hu ........................... H04N 5/04 348/607 |
| 2006/0056716 | A1* | 3/2006 | Komeno ............ H04N 5/44504 382/233 |
| 2006/0064716 | A1* | 3/2006 | Sull ................... G06F 17/30793 725/37 |

(Continued)

FOREIGN PATENT DOCUMENTS

JP          A-2013-26644          2/2013

*Primary Examiner* — Mohammad J Rahman
(74) *Attorney, Agent, or Firm* — Oliff PLC

(57) ABSTRACT

A display apparatus (projector) includes an evaluating section (image analysis section) that evaluates the type of 3D format in accordance with which an inputted image signal is formatted, an OSD data storage section (OSD memory) that stores OSD data, an OSD data dividing section (OSD processing section) that divides the OSD data stored in the OSD data storage section into columns or rows, a determining section (control unit 20) that determines, based on a result of the evaluation made by the evaluating section, whether to cause the OSD data dividing section to divide the OSD data into columns or rows, and a superimposing section (OSD processing section) that causes the OSD data dividing section to divide the OSD data based on the division determined by the determining section and superimposes the divided OSD data on a 3D formatted image.

9 Claims, 8 Drawing Sheets

(56) References Cited

U.S. PATENT DOCUMENTS

| | | | |
|---|---|---|---|
| 2008/0068505 A1* | 3/2008 | Namie | H04N 5/44504 348/569 |
| 2010/0045779 A1* | 2/2010 | Kwon | H04N 5/44504 348/46 |
| 2010/0045780 A1* | 2/2010 | Kwon | H04N 13/0048 348/51 |
| 2011/0170007 A1* | 7/2011 | Yamaguchi | H04N 5/445 348/586 |
| 2011/0216242 A1* | 9/2011 | Kabuto | H04N 5/445 348/554 |
| 2012/0038827 A1* | 2/2012 | Davis | H04N 5/45 348/588 |
| 2012/0092467 A1* | 4/2012 | Jang | G11B 27/105 348/51 |
| 2013/0057541 A1* | 3/2013 | Min | H04N 13/0037 345/419 |
| 2013/0169627 A1* | 7/2013 | Jeon | G06T 17/00 345/419 |
| 2013/0169762 A1 | 7/2013 | Kanemaru et al. | |
| 2013/0222536 A1* | 8/2013 | Hanabusa | H04N 13/0007 348/43 |
| 2013/0271570 A1* | 10/2013 | Wakabayashi | H04N 5/44543 348/43 |
| 2013/0286158 A1* | 10/2013 | Chiu | G02B 27/2264 348/43 |
| 2014/0016908 A1* | 1/2014 | Sakaniwa | H04N 13/0452 386/230 |
| 2014/0089962 A1* | 3/2014 | Ogawa | H04N 13/0051 725/29 |

* cited by examiner

DISPLAY APPARATUS AND METHOD FOR CONTROLLING DISPLAY APPARATUS

CROSS-REFERENCE

The entire disclosure of Japanese Patent Application No. 2013-233739, filed Nov. 12, 2013 and Japanese Patent Application No. 2014-059803, filed Mar. 24, 2014 are expressly incorporated by reference herein.

BACKGROUND

1. Technical Field

The present invention relates to a display apparatus and a method for controlling the display apparatus.

2. Related Art

There is a disclosed reception apparatus that performs video processing for receiving a 3D video content and three-dimensionally or two-dimensionally displaying video data and caption data, and the video processing includes first video processing for three-dimensionally displaying the video data in the received 3D video content and three-dimensionally displaying the received caption data and second video processing for two-dimensionally displaying the video data in the received 3D video content and two-dimensionally displaying the received caption data (JP-A-2013-26644). JP-A-2013-26644 describes that video images three-dimensionally formatted based on a side-by-side method or a top-and-bottom method are three-dimensionally displayed with each image enlarged horizontally or vertically.

A description will now be made of a process carried out when a 3D formatted image (video images) is inputted.

FIGS. 8A and 8B are descriptive diagrams of image processing performed by a reception apparatus when a 3D formatted image is inputted. FIG. 8A is a descriptive diagram of the side-by-side method, and FIG. 8B is a descriptive diagram of the top-and-bottom method.

In the side-by-side method, image data for the left eye and image data for the right eye are horizontally compressed by a factor of 2 and recorded in input image information SP1 in a single frame, as shown in FIG. 8A. The reception apparatus divides the input image information SP1 into image data SP2L for the left eye and image data SP2R for the right eye. The reception apparatus then horizontally enlarges the image data SP2L for the left eye and the image data SP2R for the right eye by a factor of 2 to produce output image information SP3L for the left eye and output image information SP3R for the right eye, each of which has a size corresponding to one frame, and sequentially outputs the two types of output image information.

In the top-and-bottom method, image data for the left eye and image data for the right eye are vertically compressed by a factor of 2 and recorded in input image information TP1 in a single frame, as shown in FIG. 8B. The reception apparatus divides the input image information TP1 into image data TP2L for the left eye and image data TP2R for the right eye. The reception apparatus then vertically enlarges the image data TP2L for the left eye and the image data TP2R for the right eye by a factor of 2 to produce output image information TP3L for the left eye and output image information TP3R for the right eye, each of which has a size corresponding to one frame, and sequentially outputs the two types of output image information.

JP-A-2013-26644 describes that when an OSD (on-screen display) image is displayed on a 3D video content, the OSD image is displayed in a foreground layer but describes no method for superimposing the OSD image on the 3D video content. For example, in the side-by-side method or the top-and-bottom method, in a case where OSD image data is drawn before image data for the left eye and image data for the right eye are horizontally or vertically enlarged, the OSD image is undesirably horizontally or vertically extended at the time of enlargement, resulting in a problem of an incorrect aspect ratio of the OSD image. It is conceivable to provide and use not only normal OSD image data but also OSD image data horizontally or vertically compressed by a factor of 2 on the precondition that the OSD image is horizontally or vertically enlarged, but the solution undesirably increases the data size of the stored OSD image data.

SUMMARY

An advantage of some aspects of the invention is to solve at least a part of the problems described above, and the invention can be implemented as the following aspects or application examples.

Application Example 1

This application example is directed to a display apparatus including an evaluating section that evaluates the type of 3D format in accordance with which an inputted image signal is formatted, an OSD data storage section that stores OSD data, an OSD data dividing section that divides the OSD data stored in the OSD data storage section into columns or rows, a determining section that determines, based on a result of the evaluation made by the evaluating section, whether to cause the OSD data dividing section to divide the OSD data into columns or rows, and a superimposing section that causes the OSD data dividing section to divide the OSD data based on the division determined by the determining section and superimposes the divided OSD data on a 3D formatted image.

According to the display apparatus described above, the evaluating section evaluates the type of 3D format in accordance with which an image signal is formatted. The OSD data dividing section divides OSD data stored in the OSD data storage section into columns or rows. The determining section determines, based on a result of the evaluation made by the evaluating section, whether to cause the OSD data dividing section to divide the OSD data into columns or rows. The superimposing section causes the OSD data dividing section to divide the OSD data and superimposes the divided OSD data on a 3D formatted image. As a result, the OSD data can be divided into columns or rows in accordance with the type of 3D format, and the divided OSD data can be superimposed on a 3D-formatted image.

Application Example 2

This application example is directed to the display apparatus according to the application example described above, wherein the evaluating section is capable of at least evaluating whether the type of 3D format is a side-by-side method or a top-and-bottom method, and the display apparatus further includes an image enlarging section that enlarges, after the superimposing section superimposes the divided OSD data provided by the OSD data dividing section, 3D formatted image data horizontally when the type of 3D format is the side-by-side method, and enlarges, after the superimposing section superimposes the divided OSD data provided by the OSD data dividing section, 3D formatted image data vertically when the type of 3D format is the top-and-bottom method.

According to the display apparatus described above, the evaluating section is capable of at least evaluating whether the type of 3D format is a side-by-side method or a top-and-bottom method. The image enlarging section enlarges, after the divided OSD data is superimposed, 3D formatted image data horizontally when the type of 3D format is the side-by-side method, whereas enlarging, after the divided OSD data is superimposed, 3D formatted image data vertically when the type of 3D format is the top-and-bottom method. As a result, after the OSD data is superimposed, 3D formatted image data can be enlarged in correspondence with the side-by-side method or the top-and-bottom method.

Application Example 3

This application example is directed to the display apparatus according to the application example described above, wherein the determining section causes the OSD data dividing section to divide the OSD data in a column direction when the evaluating section has evaluated the type of 3D format to be the side-by-side method, and causes the OSD data dividing section to divide the OSD data in a row direction when the evaluating section has evaluated the type of 3D format to be the top-and-bottom method.

According to the display apparatus described above, when the type of 3D format has been evaluated to be the side-by-side method, the OSD data is divided in a column direction, whereas when the type of 3D format has been evaluated to be the top-and-bottom method, the OSD data is divided in a row direction. As a result, the direction in which the OSD data is divided can be changed in accordance with the direction in which a 3D formatted image is enlarged.

Application Example 4

This application example is directed to the display apparatus according to the application example described above, wherein the OSD data dividing section divides the OSD data into odd and even columns or odd and even rows.

According to the display apparatus described above, the OSD data is divided into odd and even columns or odd and even rows. As a result, when the type of 3D format is the side-by-side method, the OSD data having been divided into odd columns and even columns can be sequentially superimposed and then enlarged, whereas when the type of 3D format is the top-and-bottom method, the OSD data having been divided into odd rows and even rows can be sequentially superimposed and then enlarged.

Application Example 5

This application example is directed to the display apparatus according to the application example described above, wherein when the type of 3D format evaluated by the evaluating section is the side-by-side method, the superimposing section superimposes OSD data formed of odd columns on an odd frame and OSD data formed of even columns on an even frame in the 3D formatted image data or superimpose OSD data formed of even columns on an odd frame and OSD data formed of odd columns on an even frame in the 3D formatted image data.

According to the display apparatus described above, when the type of 3D format is the side-by-side method, the superimposing section superimposes OSD data formed of odd columns on an odd frame and ODS data formed of even columns on an even frame in the 3D formatted image data or superimposes OSD data formed of even columns on an odd frame and OSD data formed of odd columns on an even frame in the 3D formatted image data. As a result, when an image is enlarged and the odd frame and the even frame are alternately displayed, the OSD data formed of the odd columns and the OSD data formed of the even columns are alternately displayed and can be visually recognized as a combined OSD image.

Application Example 6

This application example is directed to the display apparatus according to the application example described above, wherein when the type of 3D format evaluated by the evaluating section is the top-and-bottom method, the superimposing section superimposes OSD data formed of odd rows on an odd frame and OSD data formed of even rows on an even frame in the 3D formatted image data or superimposes OSD data formed of even rows on an odd frame and OSD data formed of odd rows on an even frame in the 3D formatted image data.

According to the display apparatus described above, when the type of 3D format is the top-and-bottom method, the superimposing section superimposes OSD data formed of odd rows on an odd frame and ODS data formed of even rows on an even frame in the 3D formatted image data or superimposes OSD data formed of even rows on an odd frame and OSD data formed of odd rows on an even frame in the 3D formatted image data. As a result, when an image is enlarged and the odd frame and the even frame are alternately displayed, the OSD data formed of the odd rows and the OSD data formed of the even rows are alternately displayed and can be visually recognized as a combined OSD image.

Application Example 7

This application example is directed to the display apparatus according to the application example described above, wherein the display apparatus is a projector.

According to the display apparatus (projector) described above, the OSD data can be divided into columns or rows in accordance with the type of 3D format, and the divided OSD data can be superimposed on a 3D-formatted image.

Application Example 8

This application example is directed to a method for controlling a display apparatus including an OSD data storage section that stores OSD data, the method including evaluating the type of 3D format in accordance with which an inputted image signal is formatted, dividing the OSD data stored in the OSD data storage section into columns or rows, determining, based on a result of the evaluation made in the evaluating, whether to cause the dividing to divide the OSD data into columns or rows, and causing the dividing to divide the OSD data based on the division determined in the determining and superimposing the divided OSD data on a 3D formatted image.

According to the method for controlling a display apparatus described above, the OSD data can be divided into columns or rows in accordance with the type of 3D format, and the divided OSD data can be superimposed on a 3D-formatted image.

When the display apparatus and the method for controlling the display apparatus described above are achieved by using a computer provided in the display apparatus, the aspects and the application examples described above can also be provided in an aspect of a program that achieves the functions of the display apparatus and the method for controlling the display apparatus, in an aspect of a recording medium on which the program is so recorded that the computer can read the program, or in any other aspect. Examples of the recording medium may include a flexible disk, an HOD (hard disk drive), a CD-ROM (compact disk read only memory), a DVD (digital versatile disk), a Blu-ray (registered trademark) disc, a magneto-optical disk, a nonvolatile memory card, an internal storage device in the display apparatus (RAM (random access memory), ROM (read only memory), or any other semiconductor memory), an external storage device (such as USB (universal serial bus) memory), and a variety of other media that can be read by the computer.

BRIEF DESCRIPTION OF THE DRAWINGS

The invention will be described with reference to the accompanying drawings, wherein like numbers reference like elements.

FIG. 4A is a descriptive diagram of original OSD image data. FIG. 4B is a descriptive diagram of thinned-out OSD image data. FIG. 4C is a descriptive diagram of enlarged OSD image data. FIG. 4D is a descriptive diagram of combined OSD image data to be visually recognized.

FIG. 7A is a descriptive diagram of original OSD image data. FIG. 7B is a descriptive diagram of thinned-out OSD image data. FIG. 7C is a descriptive diagram of enlarged OSD image data. FIG. 7D is a descriptive diagram of combined OSD image data to be visually recognized.

FIG. 8A is a descriptive diagram of a side-by-side method, and FIG. 8B is a descriptive diagram of a top-and-bottom method.

DESCRIPTION OF EXEMPLARY EMBODIMENTS

Embodiment

As an embodiment of a display apparatus, a projector capable of projecting a 3D (stereoscopic) image on which an OSD image is superimposed will be described below. To visually recognize an image projected based on a 3D method, a user needs to wear dedicated 3D glasses (not shown).

Figure 1:
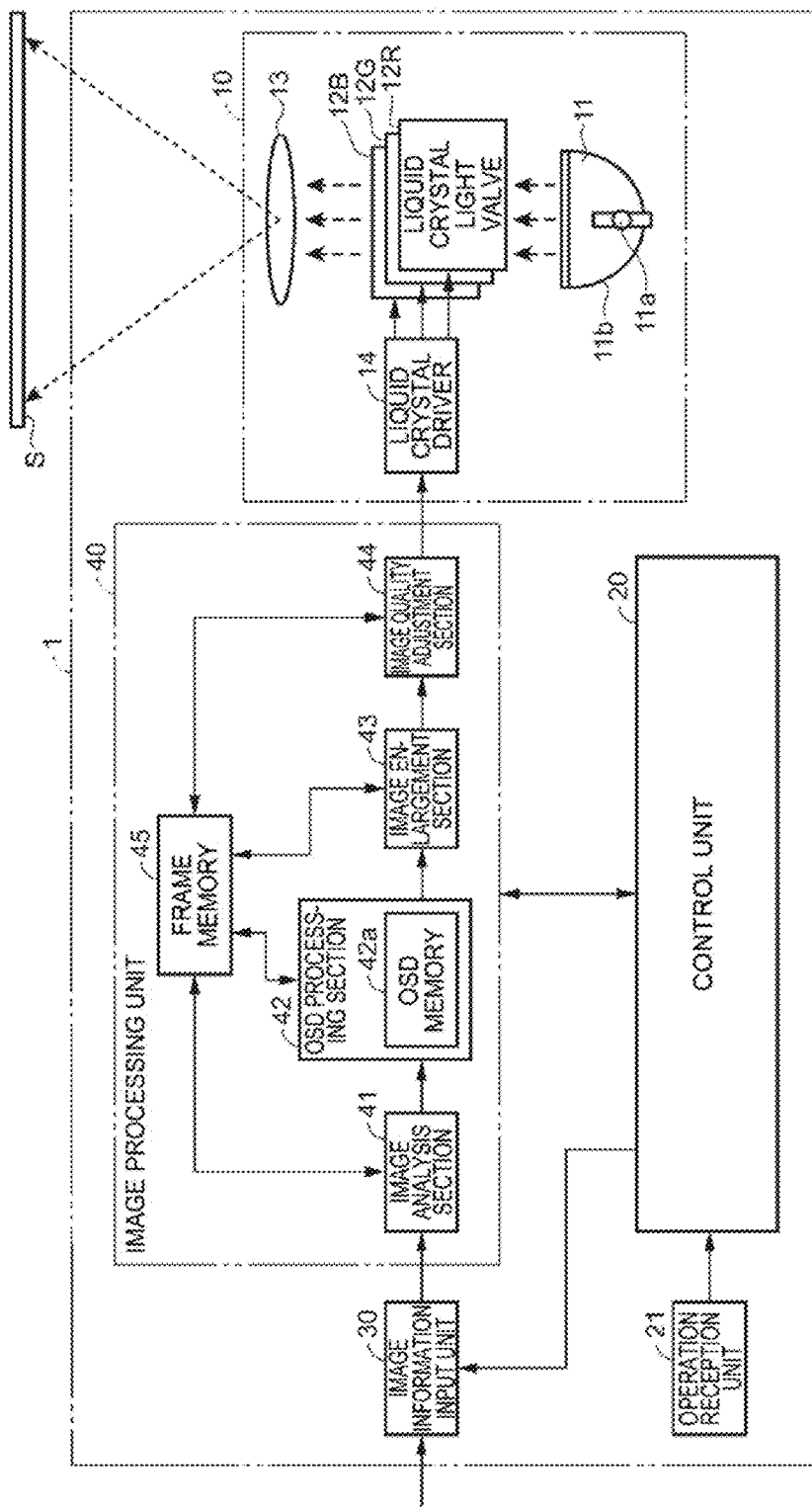
FIG. 1 is a block diagram showing a schematic configuration of a projector.

FIG. 1 is a block diagram showing a schematic configuration of a projector 1.

The projector 1 includes an image projection unit 10, a control unit 20, an operation reception unit 21, an image information input unit 30, and an image processing unit 40, as shown in FIG. 1.

The image projection unit 10 is formed, for example, of a light source section 11 as a light source, three liquid crystal light valves 12R, 12G, and 12B as light modulators, a projection lens 13 as a projection system, and a liquid crystal driver 14. In the image projection unit 10, the liquid crystal light valves 12R, 12G, and 12B modulate light outputted from the light source section 11 to form image light, and the projection lens 13 projects the image light to display an image on a projection surface S.

The light source section 11 includes a discharge-type light source lamp 11a, which is formed, for example, of an ultrahigh-pressure mercury lamp or a metal halide lamp, and a reflector 11b, which reflects light emitted from the light source lamp 11a toward the liquid crystal light valves 12R, 12G, and 12B. The light outputted from the light source section 11 is converted by an optical integration system (not shown) into light having a substantially uniform luminance distribution, and the resultant light is separated by a color separation system (not shown) into the following color light components: red (R), green (G), and blue (B), which are the three primary colors of light. The R, G, and B color light components are then incident on the liquid crystal light valves 12R, 12G, and 12B, respectively.

Each of the liquid crystal light valves 12R, 12G, and 12B is formed, for example, of a liquid crystal panel having a liquid crystal material sealed between a pair of transparent substrates. Each of the liquid crystal light valves 12R, 12G, and 12B has a rectangular pixel area where a plurality of pixels (not shown) are arranged in a matrix, and a drive voltage is applicable to the liquid crystal material on a pixel basis. When the liquid crystal driver 14 applies a drive voltage according to inputted image information to each of the pixels, the optical transmittance of the pixel is set in accordance with the image information. As a result, the light outputted from the light source section 11 is modulated when passing through the pixel areas of the liquid crystal light valves 12R, 12G, and 12B, and image light according to the image information is formed on a color light basis. The thus formed color image light fluxes are combined with one another by a light combining system (not shown) on a pixel basis into color image light, which is then enlarged and projected through the projection lens 13.

The control unit 20 includes a CPU (central processing unit), a RAM (random access memory) used to temporarily store a variety of data and other pieces of information, and a nonvolatile ROM (read only memory), and the CPU operates in accordance with a control program stored in the ROM to oversee and control the action of the projector 1.

The operation reception unit 21 is, for example, an operation panel that receives user's key operation and includes a plurality of operation keys that the user uses to issue a variety of instructions to the projector 1. The operation keys provided on the operation reception unit 21 in the present embodiment include a power supply key for alternately switching the state of power between on and off, an input switch key for switching inputted image information, a menu key for displaying a menu image the allows the user to make a variety of settings, arrow keys used to select or otherwise specify an item in the menu image, and a finalizing key for accepting a selected item.

When the user operates any of the variety of operation keys on the operation reception unit 21, the operation reception unit 21 receives the operation and outputs a control signal corresponding to the operated operation key to the control unit 20. The control unit 20, to which the control signal is inputted from the operation reception unit 21, carries out a process based on the inputted control signal to control the action of the projector 1. In place of or in addition to the operation reception unit 21, a remotely operable remote control (not shown) may be used as an input operation section. In this case, the remote control sends, for example, an infrared operation signal according to the user's operation, and a remote control signal receiver (not shown) receives the operation signal and transmits it to the control unit 20.

The image information input unit 30 has a plurality of input terminals to which image information (image signal) in a variety of formats are inputted from an external image supply apparatus, such as a video reproducing apparatus and a personal computer. The image information input unit 30 selects image information based on an instruction from the control unit 20 and outputs the selected image information to the image processing unit 40.

The image processing unit 40 includes an image analysis section 41, an OSD processing section 42, an image enlargement section 43, an image quality adjustment section 44, and a frame memory 45.

The image analysis section 41 analyzes the image information inputted from the image information input unit 30 to evaluate whether the format of the image information is a 2D format or is based on the side-by-side method or the top-and-bottom method, each of which corresponds to a 3D format. The image analysis section 41 corresponds to an evaluating section. In the present embodiment, the image analysis section 41 only evaluates whether the 3D format is based on the side-by-side method or the top-and-bottom method for ease of description but may evaluate whether or not the 3D format is based on any other 3D format method. The image analysis section 41 converts the inputted image information into image information representing the grayscale at each pixel in the liquid crystal light valves 12R, 12G, and 12B, that is, image data for defining a drive voltage applied to the pixel and stores the converted image data in the frame memory 45. In this process, when the 3D format is based on the side-by-side method or the top-and-bottom method, the image data is separated into image data for the left eye and image data for the right eye, which are then stored in the frame memory 45.

The OSD processing section 42 carries out a process of superimposing an OSD image, such as a menu image and a message image, on an image based on the inputted image information stored in the frame memory 45 (hereinafter referred to as "input image") and displaying the resultant image based on an instruction from the control unit 20. The OSD processing section 42 includes an OSD memory 42a, which stores OSD image information representing figures, fonts, and other objects for forming an OSD image. When the control unit 20 issues an instruction of superposition of an OSD image, the OSD processing section 42 reads necessary OSD image information from the OSD memory 42a and creates OSD image data. The OSD processing section 42 then stores the created OSD image data in a rewritable OSD data storage section (not shown) in the OSD memory 42a. The OSD data storage section is not necessarily provided in the OSD memory 42a and may be provided in another rewritable memory area.

The OSD processing section 42 combines the created OSD image data with the image data in the frame memory 45 in such a way that the OSD image data is superimposed on the input image in a predetermined position therein. The image data with which the OSD image data has been combined is then processed by the image enlargement section 43. When the control unit 20 has issued no instruction of superposition of an OSD image, the OSD processing section 42 does not process the image data in the frame memory 45.

When the 3D format of the input image is based on the side-by-side method, the OSD processing section 42 creates OSD odd column data formed only of odd columns with even columns thinned out and OSD even column data formed only of even columns with odd columns thinned out. On the other hand, when the 3D format of the input image is based on the top-and-bottom method, the OSD processing section 42 creates OSD odd row data formed only of odd rows with even rows thinned out and OSD even row data formed only of even rows with odd rows thinned out. The OSD processing section 42 corresponds to an OSD data dividing section.

The OSD processing section 42 combines the OSD odd column data, the OSD even column data, the OSD odd row data, or the OSD even row data with the image data for the left eye and the image data for the right eye in the frame memory 45 in such a way that the created OSD image data is superimposed on the input image in a predetermined position therein. The OSD processing section 42 corresponds to a superimposing section.

The image enlargement section 43 is formed of a scaler. The image enlargement section 43, specifically, the scaler scales the image data having undergone the process carried out by the OSD processing section 42 and having been stored in the frame memory 45 for enlargement, reduction, conversion of the aspect ratio, and other types of scaling processing. When the 3D format is based on the side-by-side method, the image enlargement section 43 horizontally enlarges the image data for the left eye and the image data for the right eye by a factor of 2. When the 3D format is based on the top-and-bottom method, the image enlargement section 43 vertically enlarges the image data for the left eye and the image data for the right eye by a factor of 2. At this point, the OSD image data having been combined with the image data is also enlarged. In the present embodiment, the image enlargement section 43 also performs frame rate conversion.

The image quality adjustment section 44 performs image quality adjustment and other types of image processing for adjusting the brightness, contrast, sharpness, tint, and other image qualities of the image data having undergone the process carried out by the image enlargement section 43 and having been stored in the frame memory 45. The image quality adjustment section 44 then outputs the image data in the frame memory 45 to the liquid crystal driver 14.

When the liquid crystal driver 14 drives the liquid crystal light valves 12R, 12G, and 12B in accordance with the image data inputted from the image quality adjustment section 44, the light outputted from the light source section 11 is modulated by the liquid crystal light valves 12R, 12G, and 12B into image light according to the image information, and the projection lens 13 projects the image light.

A description will next be made of a process in which the projector 1 superimposes an OSD image on a 3D formatted image and displays the resultant image with reference to a flowchart. An overall process in which the projector 1 performs the OSD superimposition and display will first be described.

Figure 2:
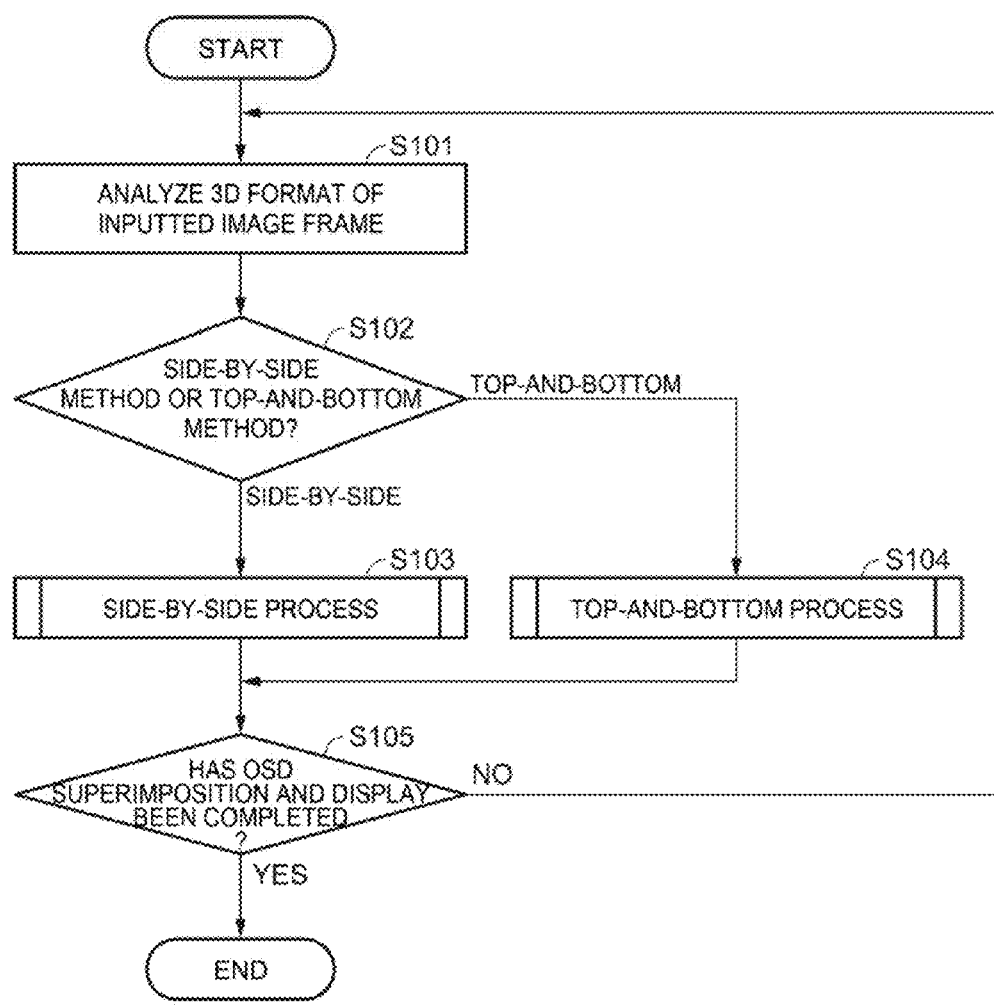
FIG. 2 is a flowchart of an OSD superimposition process carried out by the projector according to an embodiment.

FIG. 2 is a flowchart of the OSD superimposition process carried out by the projector 1 according to the present embodiment.

The image analysis section 41 in the projector 1 analyzes the image format of an inputted image frame (step S101). The image analysis section 41 evaluates whether the image format is based on the side-by-side method or the top-and-bottom method and notifies the control unit 20 of a result of the evaluation (step S102). When the image format is not based on the side-by-side method or the top-and-bottom method, another OSD superimposition process is carried out but will not be described in the present embodiment for simplification of the description.

When the image format is based on the side-by-side method (SIDE-BY-SIDE in step S102), the control unit 20 carries out a side-by-side process (step S103). The control then proceeds to step S105. When the image format is based on the top-and-bottom method (TOP-AND-BOTTOM in step S102), the control unit 20 carries out a top-and-bottom process (step S104). The control then proceeds to step S105. The control unit 20 that carries out the processes described above corresponds to a determining section.

The control unit 20 evaluates whether or not the OSD superimposition and display has been completed (step S105). When the OSD superimposition and display has not been completed (NO in step S105), the control proceeds to step S101, and the processes described above are carried out on the following image frame. When the OSD superimposition and display has been completed (YES in step S105), the OSD superimposition process carried out when a 3D image is displayed is terminated.

A description will next be made of the side-by-side process carried out on an image frame basis.

Figure 3:
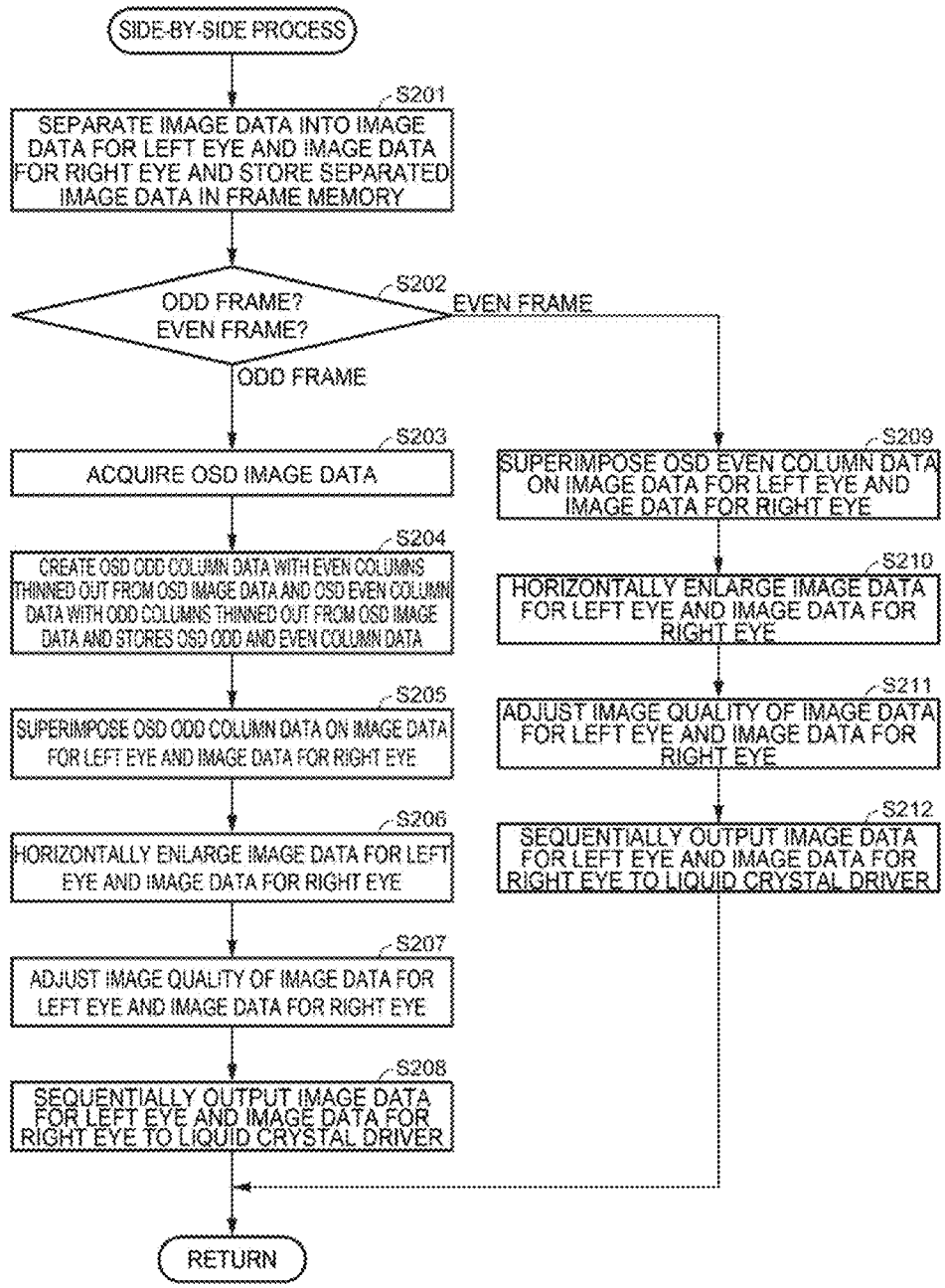
FIG. 3 is a flowchart of a side-by-side process carried out by the projector.

FIG. 3 is a flowchart of the side-by-side process carried out by the projector 1.

The image analysis section 41 separates image data into image data for the left eye and image data for the right eye and stores the separated image data in the frame memory 45 (step S201). The control unit 20 evaluates whether the image frame being currently processed is an odd frame or an even frame (step S202). When the current frame is an odd frame (ODD FRAME in step S202), the OSD processing section 42 acquires OSD image data based on an instruction from the control unit 20 (step S203).

A description will now be made of creation of OSD image data. When the control unit 20 issues an instruction of displaying an OSD image, the OSD processing section 42 reads necessary OSD image information from the OSD memory 42a and creates OSD image data. The created OSD image data is stored in the rewritable OSD data storage section (not shown) in the OSD memory 42a. When the control unit 20 issues an instruction of update of an OSD image, the OSD processing section 42 recreates OSD image data and stores the recreated OSD image data in the OSD data storage section. The OSD processing section 42 acquires the OSD image data stored in the OSD data storage section as described above. That is, creation and acquisition of OSD image data are performed in different processes (programs) in the same OSD processing section 42.

The OSD processing section 42 further creates OSD odd column data with even columns thinned out from the created OSD image data and OSD even column data with odd columns thinned out from the created OSD image data and stores the OSD odd and even column data in the OSD data storage section (step S204). The OSD odd column data and the OSD even column data may instead be created by separating the OSD image data into the odd columns and the even columns.

The OSD processing section 42 superimposes the OSD odd column data on the image data for the left eye and the image data for the right eye in the frame memory 45 (step S205). At this point, when the user desires to display the OSD image three-dimensionally (stereoscopically), the position where the OSD odd column data is superimposed on the image data for the left eye and the position where the OSD odd column data is superimposed on the image data for the right eye are set apart from each other (that is, to provide parallax).

The image enlargement section 43 horizontally enlarges the image data for the left eye and the image data for the right eye in the frame memory 45 (step 3206). That is, the image data for the left eye and the image data for the right eye configured based on the side-by-side method are so enlarged that the enlarged image data have resolution of a projected image.

The image quality adjustment section 44 adjusts the image quality of the enlarged image data for the left eye and image data for the right eye in the frame memory 45 based on an instruction from the control unit 20 (step S207). The image quality adjustment section 44 then sequentially outputs the image data for the left eye and the image data for the right eye having undergone the image quality adjustment to the liquid crystal driver 14 (step S208). The side-by-side process carried out on an odd frame is then completed (return).

When the current frame is an even frame (EVEN FRAME in step S202), the control unit 20 issues an instruction to the OSD processing section 42, and the OSD processing section 42 superimposes the OSD even column data created when the odd frame is processed on the image data for the left eye and the image data for the right eye in the frame memory 45 (step S209). At this point, when the user desires to display the OSD image three-dimensionally (stereoscopically), the position where the OSD even column data is superimposed on the image data for the left eye and the position where the OSD even column data is superimposed on the image data for the right eye are set apart from each other (that is, to provide parallax).

The image enlargement section 43 horizontally enlarges the image data for the left eye and the image data for the right eye in the frame memory 45 (step S210). That is, the image data for the left eye and the image data for the right eye configured based on the side-by-side method are so enlarged that the enlarged image data have resolution of a projected image.

The image quality adjustment section 44 adjusts the image quality of the enlarged image data for the left eye and image data for the right eye in the frame memory 45 based on an instruction from the control unit 20 (step S211). The image quality adjustment section 44 then sequentially outputs the image data for the left eye and the image data for the right eye having undergone the image quality adjustment to the liquid crystal driver 14 (step S212). The side-by-side process carried out on an even frame is thus completed (return).

As described above, in the side-by-side process, when the current frame is an odd frame, the OSD odd column data and the OSD even column data are created and stored, and the OSD odd column data is superimposed on image data for the left eye and image data for the right eye in the odd frame. The image data for the left eye and the image data for the right eye in the odd frame are then enlarged and sequentially outputted. When the current frame is an even frame, the stored OSD even column data is superimposed on image data for the left eye and image data for the right eye in the even frame. The image data for the left eye and the image data for the right eye in the even frame are then enlarged and sequentially outputted. The projector 1 can thus project and display a 3D image on which an OSD image is superimposed.

A description will next be made of a change in OSD image data processed by the OSD processing section 42 in the side-by-side process with reference to the drawings.

Figure 4A:
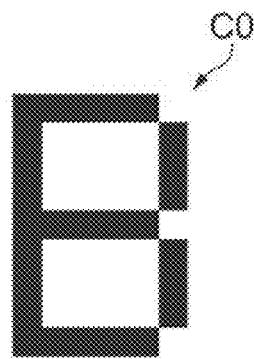
FIGS. 4A to 4D are descriptive diagrams showing OSD image data in the side-by-side process.

FIGS. 4A to 9D are descriptive diagrams showing OSD image data in the side-by-side process. FIG. 4A is a descriptive diagram of original OSD image data. FIG. 4B is a descriptive diagram of thinned-out OSD image data. FIG. 4C is a descriptive diagram of enlarged OSD image data. FIG. 4D is a descriptive diagram of combined OSD image data to be visually recognized.

Figure 4B:
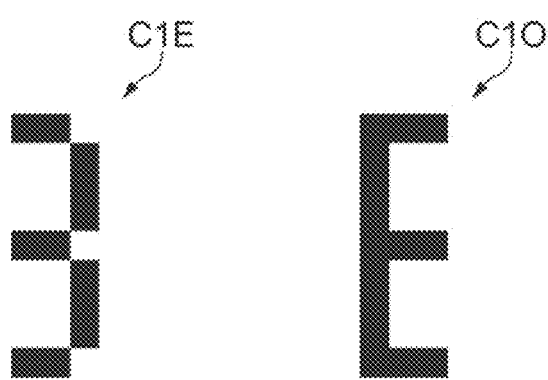

FIG. 4A shows original OSD image data C0 formed of one OSD character "B". It is assumed in the present embodiment that the line that forms a character has a width of 1 dot. FIG. 4B shows OSD even column data C1O, which is OSD image data created by thinning an odd column from the original OSD image data C0 and is hence formed of an even column, and OSD odd column data C1O, which is OSD image data created by thinning the even column from the original OSD image data C0 and is hence formed of the odd column. The OSD processing section 42 superimposes the OSD odd column data C1O or the OSD even column data C1E on the image data for the left eye and the image data for the right eye in the frame memory 45.

Figure 4C:
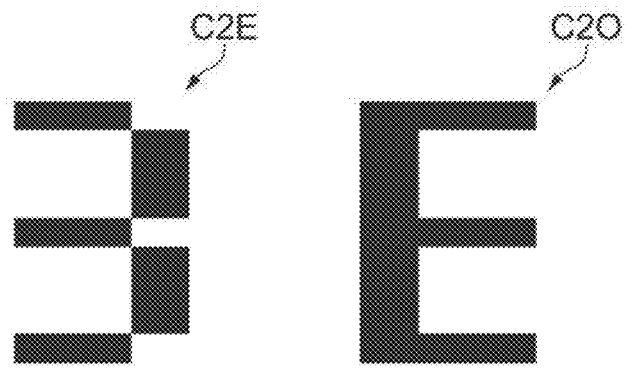
Figure 4D:
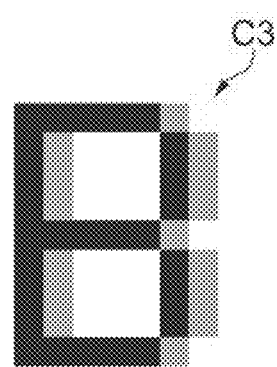

FIG. 4C shows OSD even column data C2E and OSD odd column data C2O horizontally enlarged in association with the horizontal enlargement of the image data for the left eye and the image data for the right eye. FIG. 4D shows OSD combined data C3, which is a combination of the OSD odd column data C2O and the OSD even column data C2E combined and visually recognized when an odd frame and an even frame are sequentially projected. The user can visually recognize the OSD combined data C3. It is noted that the OSD combined data C3, which has undergone the thinning-out process followed by the enlargement process, potentially shows lines (gray lines) that are not present in the original OSD image data C0. It is further noted that the horizontal enlargement process is not necessarily based on a simple twofold enlargement method and may be an enlargement process based on any of a variety of interpolation methods.

In the present embodiment, the description has been made of the side-by-side process carried out on the OSD image data formed of one OSD character "B" as shown in FIGS. 4A to 4D, but OSD image data is in practice formed of a plurality of characters and figures in many cases. In such cases, the side-by-side process is carried out on OSD image data containing a plurality of characters and figures.

Figure 5:
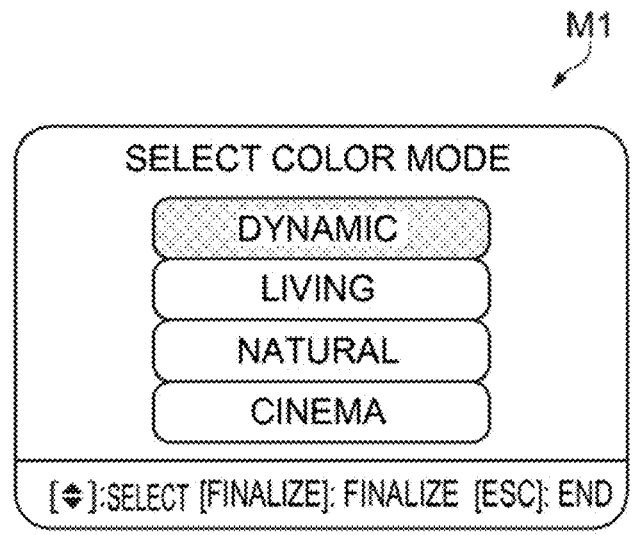
FIG. 5 is a descriptive diagram showing a menu image as OSD image data.

FIG. 5 is a descriptive diagram showing a menu image as OSD image data.

A menu image M1 is drawn based on OSD image data containing a plurality of characters and figures, as shown in FIG. 5. The side-by-side process, which has been described above, or the top-and-bottom process, which will be described later, is carried out on the menu image M1 and other OSD image data.

A description will next be made of the top-and-bottom process carried out on an image frame basis when the 3D format is based on the top-and-bottom method.

Figure 6:
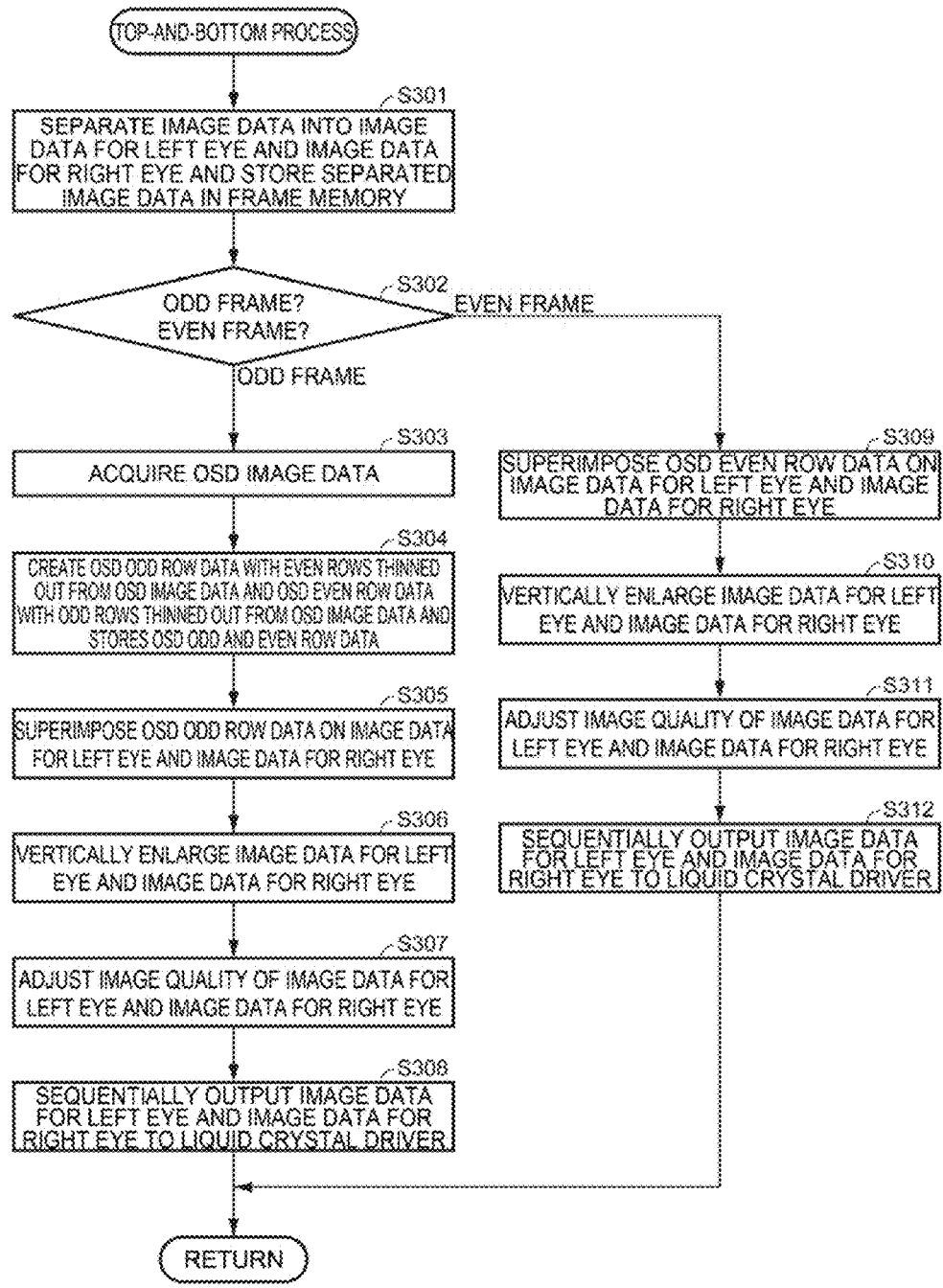
FIG. 6 is a flowchart of a top-and-bottom process carried out by the projector.

FIG. 6 is a flowchart of the top-and-bottom process carried out by the projector 1.

The processes in the steps from S301 to S303 are the same as those in the steps from S201 to S203 in the side-by-side process described above, and no description of the processes in the steps from S301 to S303 will therefore be made.

The OSD processing section 42 creates OSD odd row data with even rows thinned out from the OSD image data and OSD even row data with odd rows thinned out from the OSD image data and stores the OSD odd and even row data in the OSD data storage section (step S304). The OSD odd row data and the OSD even row data may instead be created by separating the OSD image data into the odd rows and the even rows.

The OSD processing section 42 superimposes the OSD odd row data on the image data for the left eye and the image data for the right eye in the frame memory 45 (step S305). At this point, when the user desires to display the OSD image three-dimensionally (stereoscopically), the position where the OSD odd row data is superimposed on the image data for the left eye and the position where the OSD odd row data is superimposed on the image data for the right eye are set apart from each other (that is, to provide parallax).

The image enlargement section 43 vertically enlarges the image data for the left eye and the image data for the right eye in the frame memory 45 (step S306).

The processes in the steps from S307 to S308 are the same as those in the steps from S207 to S208 in the side-by-side process described above, and no description of the processes in the steps from S307 to S308 will therefore be made.

When the current frame is an even frame (EVEN FRAME in step S302), the control unit 20 issues an instruction to the OSD processing section 42, and the OSD processing section 92 superimposes the OSD even row data created when the odd frame is processed on the image data for the left eye and the image data for the right eye in the frame memory 45 (step S309). At this point, when the user desires to display the OSD image three-dimensionally (stereoscopically), the position where the OSD even row data is superimposed on the image data for the left eye and the position where the OSD even row data is superimposed on the image data for the right eye are set apart from each other (that is, to provide parallax).

The image enlargement section 43 vertically enlarges the image data for the left eye and the image data for the right eye in the frame memory 45 (step S310).

The processes in the steps from S311 to S312 are the same as those in the steps from S211 to S212 in the side-by-side process described above, and no description of the processes in the steps from S311 to S312 will therefore be made.

As described above, in the top-and-bottom process, when the current frame is an odd frame, the OSD odd row data and the OSD even row data are created and stored, and the OSD odd row data is superimposed on image data for the left eye and image data for the right eye in the odd frame. The image data for the left eye and the image data for the right eye in the odd frame are then enlarged and sequentially outputted. When the current frame is an even frame, the stored OSD even row data is superimposed on image data for the left eye and image data for the right eye in the even frame. The image data for the left eye and the image data for the right eye in the even frame are then enlarged and sequentially outputted. The projector 1 can thus project and display a 3D image on which an OSD image is superimposed.

A description will next be made of a change in OSD image data processed by the OSD processing section 42 in the top-and-bottom process with reference to the drawings.

Figure 7A:
FIGS. 7A to 7D are descriptive diagrams showing OSD image data in the top-and-bottom process.
Figure 7B:
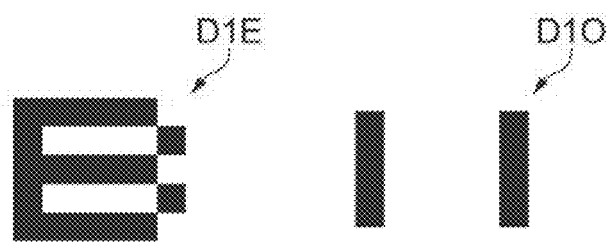
Figure 7C:
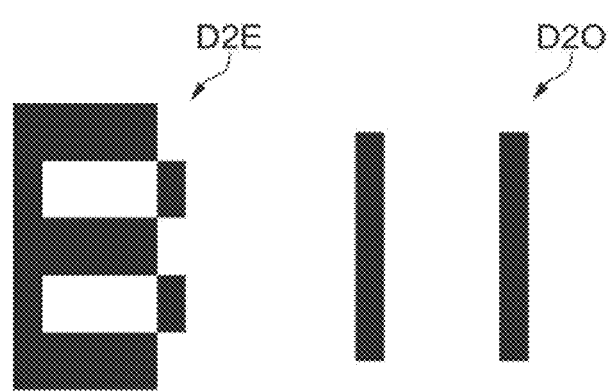
Figure 7D:
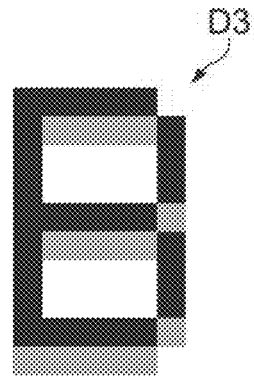
Figure 8A:
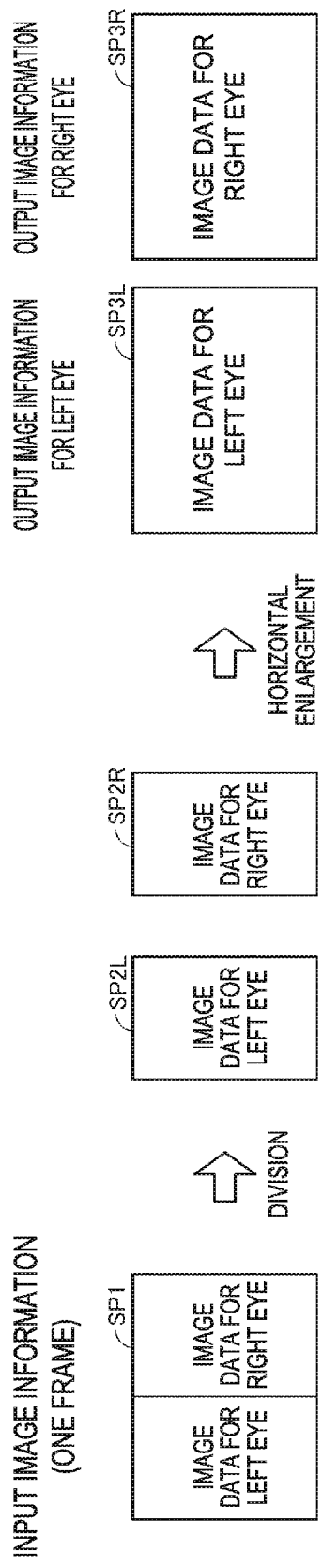
FIGS. 8A and 8B are descriptive diagrams of image processing performed by a reception apparatus when a 3D formatted image is inputted.
Figure 8B:
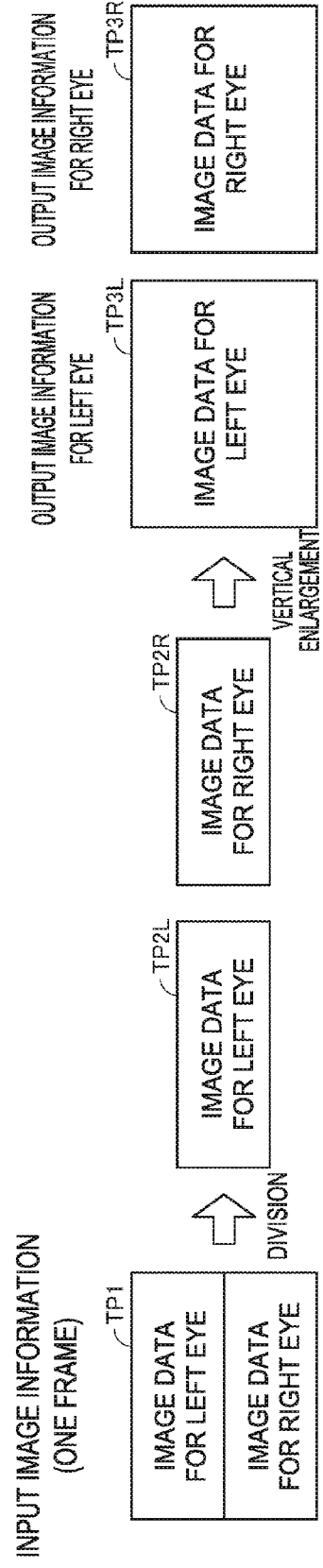

FIGS. 7A to 7D are descriptive diagrams showing OSD image data in the top-and-bottom process. FIG. 7A is a descriptive diagram of original OSD image data. FIG. 7B is a descriptive diagram of thinned-out OSD image data. FIG. 7C is a descriptive diagram of enlarged OSD image data. FIG. 7D is a descriptive diagram of combined OSD image data to be visually recognized.

FIG. 7A shows original OSD image data D0 formed of one OSD character "B". It is assumed in the present embodiment that the line that forms a character has a width of 1 dot. FIG. 7B shows OSD even row data D1E, which is OSD image data created by thinning odd rows from the original OSD image data D0 and hence formed of even rows, and OSD odd row data D1O, which is OSD image data created by thinning the even rows from the original OSD image data D0 and hence formed of the odd rows. The OSD processing section 42 superimposes the OSD odd row data D1O or the OSD even row data D1E on the image data for the left eye and the image data for the right eye in the frame memory 45.

FIG. 7C shows OSD even row data D2E and OSD odd row data D2O vertically enlarged in association with the vertical enlargement of image data for the left eye and image data for the right eye. FIG. 7D shows OSD combined data D3, which is a combination of the OSD odd row data D2O and the OSD even row data D2E combined and visually recognized when an odd frame and an even frame are sequentially projected. The user can visually recognize the OSD combined data D3. It is noted that the OSD combined data D3, which has undergone the thinning-out process followed by the enlargement process, potentially shows lines (gray lines) that are not present in the original OSD image data D0. It is further noted that the vertical enlargement process is not necessarily based on a simple twofold enlargement method and may be an enlargement process based on any of a variety of interpolation methods.

According to the embodiment described above, the following advantageous effects are provided.

(1) The projector 1 evaluates the type of the 3D format in accordance with which an image signal is formatted. The OSD processing section 42 creates OSD image data. When the 3D format is based on the side-by-side method, the OSD processing section 42 creates OSD odd column data with even columns thinned out from the OSD image data and OSD even column data with odd columns thinned out from the OSD image data. In an odd frame, the OSD processing section 42 superimposes the OSD odd column data on image data for the left eye and image data for the right eye configured based on the side-by-side method. The image data for the left eye and the image data for the right eye are then horizontally enlarged and sequentially outputted to the liquid crystal driver 14. Further, in an even frame, the OSD processing section 42 superimposes the OSD even column data on image data for the left eye and image data for the right eye configured based on the side-by-side method. The image data for the left eye and the image data for the right eye are then horizontally enlarged and sequentially outputted to the liquid crystal driver 14. As a result, in the side-by-side method, the OSD odd column data is superimposed on the odd frame and the OSD even column data is superimposed on the even frame, followed by projection of the resultant odd and even frames, whereby a viewer can visually recognize an OSD image that is a combination of the two types of OSD image data and hence has substantially the original size. That is, the embodiment is beneficial because the situation in which image data is horizontally enlarged and an OSD image is also horizontally enlarged accordingly and projected in a horizontally enlarged form can be avoided, whereby the viewer can visually recognize the OSD image having a correct aspect ratio.

(2) When the 3D format is based on the side-by-side method, the OSD processing section 42 in the projector 1 creates, when it processes an odd frame, OSD odd column data with even columns thinned out from OSD image data and OSD even column data with odd columns thinned out from the OSD image data and stores the OSD odd and even column data. In this process, the OSD odd column data and the OSD even column data are created by separating odd columns and even columns in the OSD image data from each other. As a result, when an even frame is processed, no OSD even column data is required to be created, whereby the processes can be simplified and carried out at increased speed.

(3) When the 3D format is based on the top-and-bottom method, the OSD processing section 42 in the projector 1 creates OSD odd row data with even rows thinned out from OSD image data and OSD even row data with odd rows thinned out from the OSD image data. In an odd frame, the OSD processing section 42 superimposes the OSD odd row data on image data for the left eye and image data for the right eye configured based on the top-and-bottom method. The image data for the left eye and the image data for the right eye are then vertically enlarged and sequentially outputted to the liquid crystal driver 14. Further, in an even frame, the OSD processing section 42 superimposes the OSD even row data on image data for the left eye and image data for the right eye configured based on the top-and-bottom method. The image data for the left eye and the image data for the right eye are then vertically enlarged and sequentially outputted to the liquid crystal driver 14. As a result, in the top-and-bottom method, the OSD odd row data is superimposed on the odd frame and the OSD even row data is superimposed on the even frame, followed by projection of the resultant odd and even frames, whereby the viewer can visually recognize an OSD image that is a combination of the two types of OSD image data and hence has substantially the original size. That is, the embodiment is beneficial because the situation in which image data is vertically enlarged and an OSD image is also vertically enlarged accordingly and projected in a vertically enlarged form can be avoided, whereby the viewer can visually recognize the OSD image having a correct aspect ratio.

(4) When the 3D format is based on the top-and-bottom method, the OSD processing section 42 in the projector 1 creates, when it processes an odd frame, OSD odd row data with even rows thinned out from OSD image data and OSD even row data with odd rows thinned out from the OSD image data and stores the OSD odd and even row data. In this process, the OSD odd row data and the OSD even row data are created by separating odd rows and even rows in the OSD image data from each other. As a result, when an even frame is processed, no OSD even row data is required to be created, whereby the processes can be simplified and carried out at increased speed.

(5) The OSD processing section 42 in the projector can create OSD image data horizontally or vertically compressed by a factor of 2 by performing the OSD image processing as long as the OSD memory 42a stores OSD image information for 2D formatting. That is, no OSD image information horizontally or vertically compressed by a factor of 2 for 3D formatting (side-by-side method or top-and-bottom method) is required to be provided in advance in addition to the OSD image information for 2D formatting, whereby an increase in memory capacity can be avoided.

The embodiment described above is not necessarily employed, and a variety of changes, improvements, and other modifications can be mage thereto. Variations will be described below.

Variation 1

In the embodiment described above, in the side-by-side process, when an odd frame is processed, OSD odd column data and OSD even column data are created and stored, but the OSD even column data may instead be created when an even frame is processed.

Variation 2

In the embodiment described above, in the top-and-bottom process, when an odd frame is processed, OSD odd row data and OSD even row data are created and stored, but the OSD even row data may instead be created when an even frame is processed.

Variation 3

In the embodiment described above, in the side-by-side process, when an odd frame is processed, the OSD odd column data is superimposed on image data for the left eye and image data for the right eye, but the OSD even column data may instead be superimposed thereon. In this case, when an even frame is processed, the OSD odd column data is superimposed on image data for the left eye and image data for the right eye.

Variation 4

In the embodiment described above, in the top-and-bottom process, when an odd frame is processed, the OSD odd row data is superimposed on image data for the left eye and image data for the right eye, but the OSD even row data may instead be superimposed thereon. In this case, when an even frame is processed, the OSD odd row data is superimposed on image data for the left eye and image data for the right eye.

Variation 5

In the embodiment described above, the light source section 11 is formed of the discharge-type light source lamp 11a but can instead be formed of an LED (light emitting diode) light source, a laser or any other solid-state light source, or any other type of light source.

Variation 6

In the embodiment described above, the projector 1 uses the transmissive liquid crystal light valves 12R, 12G, and 12B as the light modulators but can instead use reflective liquid crystal light valves or other reflective light modulators. Further, a micromirror array device that controls the exiting direction of light incident on each micromirror that serves as a pixel to modulate light emitted from a light source or any other similar device can instead be used as each of the light modulators.

Variation 7

In the embodiment described above, the description has been made with reference to the projector 1, but the display apparatus is not limited to a projector. For example, the embodiment descried above is also applicable to a rear projector integrated with a transmissive screen, a liquid crystal display, a plasma display, an organic EL (electro luminescence) display, a CRT (cathode ray tube) display, a head-mounted display, or any other display apparatus or a television receiver or any other self-luminous display apparatus.

What is claimed is:

1. A display apparatus comprising:
a memory that stores uncompressed on-screen display (OSD) data; and
a processor programmed to:
receive an inputted three-dimensional (3D) image signal including compressed image data;
determine, based on the type of 3D compression format of the compressed 3D image data, whether the stored uncompressed OSD data should be divided into one of: columns or rows;
when it is determined that the OSD data should be divided into columns, divided the OSD data into columns;
when it is determined that the OSD data should be divided into rows, divide the OSD data into rows;
superimpose the divided OSD data onto the compressed 3D image data so that there is no undesirable aspect ratio when the OSD data is enlarged;
enlarge the compressed 3D image data along with the superimposed divided OSD data; and
control the display apparatus to project a 3D image along with the enlarged superimposed divided OSD data.

2. The display apparatus according to claim 1, wherein the processor is further programmed to:
determining whether the type of 3D compression format is a side-by-side method or a top-and-bottom method, and
after the divided OSD data is superimposed onto the compressed 3D image data, perform one of:
enlarging the compressed 3D image data along with the superimposed divided OSD data horizontally when the type of 3D format is the side-by-side method, and
enlarging the compressed 3D image data along with the superimposed divided OSD data vertically when the type of 3D format is the top-and-bottom method.

3. The display apparatus according to claim 2, wherein the processor is further programmed to:
divide the OSD data in a column direction when the type of 3D compression format is the side-by-side method, and
divide the OSD data in a row direction when the type of 3D compression format is the top-and-bottom method.

4. The display apparatus according to claim 3, wherein the processor is further programmed to divide the OSD data into odd and even columns or odd and even rows, respectively.

5. The display apparatus according to claim 4, wherein the processor is further programmed to: when the type of 3D compression format of the compressed 3D image data is the side-by-side method, (i) superimpose the OSD data formed of odd columns on an odd frame of the compressed 3D image data, and the OSD data formed of even columns on an even frame of the compressed 3D image data, or (ii) superimpose the OSD data formed of even columns on an odd frame of the compressed 3D image data, and the OSD data formed of odd columns on an even frame of the compressed 3D image data.

6. The display apparatus according to claim 4, wherein the processor is further programmed to: when the type of 3D compression format of the compressed 3D image data is the top-and-bottom method, (i) superimpose the OSD data formed of odd rows on an odd frame of the compressed 3D image data, and the OSD data formed of even rows on an even frame of the compressed 3D image data, or (ii) superimpose the OSD data formed of even rows on an odd frame of the compressed 3D image data, and the OSD data formed of odd rows on an even frame of the compressed 3D image data.

7. The display apparatus according to claim 1, wherein the display apparatus is a projector.

8. A method for controlling a display apparatus including a memory that stores uncompressed on-screen display (OSD) data, the method comprising:
  receiving, by a processor, an inputted three-dimensional (3D) image signal including compressed image data;
  determining, by the processor, based on the type of 3D compression format of the compressed 3D image data, whether the stored uncompressed OSD data should be divided into one of: columns or rows;
  when the processor determines that the OSD data should be divided into columns, dividing the OSD data into columns;
  when the processor determines that the OSD data should be divided into rows, dividing the OSD data into rows;
  superimposing, by the processor, the divided OSD data onto the compressed 3D image data so that there is no undesirable aspect ratio when the OSD data is enlarged;
  enlarging, by the processor, the compressed 3D image data along with the superimposed divided OSD data; and
  controlling, by the processor, the display apparatus to project a 3D image along with the enlarged superimposed divided OSD data.

9. The display apparatus according to claim 1, wherein the processor is further programmed to:
  when it is determined that the 3D compression format is a side-by-side 3D format, divide the OSD data into columns, and
  when it is determined that the 3D compression format is a top-and-bottom 3D format, divide the OSD data into rows.

* * * * *